(12) United States Patent
Mohan

(10) Patent No.: US 8,327,200 B1
(45) Date of Patent: Dec. 4, 2012

(54) INTEGRATED CIRCUIT PROVIDING IMPROVED FEED BACK OF A SIGNAL

(75) Inventor: Sundararajarao Mohan, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 883 days.

(21) Appl. No.: 12/417,448

(22) Filed: Apr. 2, 2009

(51) Int. Cl.
*G06F 11/00* (2006.01)

(52) U.S. Cl. ............ 714/725; 714/724; 714/48; 714/25

(58) Field of Classification Search .................. 714/724, 714/725, 25, 48
See application file for complete search history.

(56) References Cited

U.S. PATENT DOCUMENTS

| 6,903,582 B2 * | 6/2005 | Gaskins et al. ............. 327/141 |
| 2002/0194543 A1 * | 12/2002 | Veenstra et al. ............. 714/39 |

OTHER PUBLICATIONS

Embedded Processor Block Reference Guide, UG200 (v1.0), Jan. 15, 2008, pp. 171-172, Xilinx, Inc. 2100 Logic Drive, San Jose, CA.
PowerPC 405 Processor Block Reference Guide, UG018 (v2.2), Jun. 5, 2007, pp. 132-133, Xilinx, Inc. 2100 Logic Drive, San Jose, CA.
U.S. Appl. No. 11/999,191, filed Dec. 3, 2007, Steven E. McNeil, Xilinx, Inc. 2100 Logic Drive, San Jose, California 95124.

* cited by examiner

*Primary Examiner* — Scott Baderman
*Assistant Examiner* — Sarai Butler
(74) *Attorney, Agent, or Firm* — Thomas George

(57) ABSTRACT

An integrated circuit ("IC") in which a debug signal is fed back within a core block is disclosed. The core block generates the debug signal. The core block includes a hardened routing that routes the debug signal within the core block. The IC also includes a programmable routing, coupled to the core block, to route the debug signal external to the core block. The hardened routing transmits the debug signal at a faster rate than the programmable routing. Further, the IC includes a selection device, coupled to the hardened routing and the programmable routing, to select one of: the hardened routed signal or the externally routed signal. In addition, the IC includes an external debug circuit, coupled to the programmable routing, to condition the externally routed signal.

19 Claims, 3 Drawing Sheets

INTEGRATED CIRCUIT PROVIDING IMPROVED FEED BACK OF A SIGNAL

FIELD OF THE INVENTION

The invention relates to integrated circuits (ICs). More particularly, an embodiment of the invention relates to feed back of a signal used by a feature of a core block.

BACKGROUND OF THE INVENTION

Integrated circuits ("ICs") such as, for example, programmable integrated circuits can be programmed to perform specific functions. One example of programmable integrated circuits is programmable logic devices ("PLDs") which can be programmed by a user to perform specified logic functions. One type of programmable logic device, called a field programmable gate array ("FPGA"), is popular because of a superior combination of capacity, flexibility, time-to-market, and cost.

In a typical architecture, the FPGA includes a processor, an array of configurable logic blocks ("CLBs"), and programmable input/output blocks ("IOBs") which provide external access to the CLBs. The processor, CLBs, and IOBs are interconnected by programmable fabric routing. The fabric routing comprises many interconnect wires and associated programmable interconnect points (PIPs) which can be programmed to selectively route signals among the various CLBs and IOBs.

The processor typically implements numerous debug features such as a trace feature. When the trace feature is enabled, the instruction stream executed by the processor is monitored and certain debug events are used to cause trigger events. When a trigger event occurs, the processor asserts an output-trigger-event signal to indicate that the trigger event occurred. The output-trigger-event signal is typically modified outside the processor and fed back to the processor using the fabric routing.

For proper operation of the trace feature, there is typically a constraint that the output-trigger-event signal be fed back to the processor within less than a fraction of one clock period. However, placement of pins on the processor is based on optimizing processor performance rather than optimizing debug features, and thus the debug pins associated with the input and output trigger-event signals are typically placed far apart from each other. Thus, the delays associated with using the fabric routing (e.g., the delay associated with driving the output-trigger-event signal to two or more CLBs) are too great to satisfy this constraint when the processor is running at or near maximum speed. As a result, features such as trace collection cannot be done reliably unless the processor is configured to run at a slower speed. However, processor performance and efficiency are significantly decreased if the processor is configured to run at a slower speed. In addition, a problem may not appear if the processor is configured to run at a slower speed because the problem may only occur when the processor is running at the faster speed. For example, deadlock may occur between the processor and a hard disk drive only when the processor is running at full speed. However, deadlock may not occur when the processor is running at a slower speed.

Therefore, it is desirable to feed back a signal such that stringent timing requirements are satisfied while still maximizing processor performance.

SUMMARY OF THE INVENTION

A first embodiment of an integrated circuit ("IC") includes a core block that generates a debug signal. The core block includes a hardened routing to route the debug signal within the core block. In addition, the IC includes programmable routing, coupled to the core block, to route the debug signal external to the core block. The hardened routing transmits the debug signal at a faster rate than the programmable routing. Further, the IC includes a selection device, coupled to the hardened routing and the programmable routing, to select the hardened routed signal or the externally routed signal. In addition, the IC includes an external debug circuit, coupled to the programmable routing, to condition the externally routed signal.

In this embodiment, the core block can include a debug module that is coupled to the hardened routing, the programmable routing, and the selection device. The debug module can generate the debug signal, and an output of the selection device can be fed back to the debug module. The hardened routed signal can be fed back to the debug module within a target number of clock cycles. The external debug circuit can condition the externally routed signal by combining the externally routed signal with a signal representing a type of debug event, or a signal representing a user-specified debug event. In addition, the hardened routing can be a non-programmable conductive path. The selection device can be a multiplexer that includes a control input, where the control input is coupled to: (1) a pin of the integrated circuit whose value is user controlled, or (2) a control bit that is accessible by the core block. The selection device can be a multiplexer that resides within the core block. The integrated circuit itself can be a field programmable gate array.

An embodiment of a method to feed back a debug signal within a core block of an integrated circuit includes: generating the debug signal; routing the debug signal within the core block using a hardened routing; routing the debug signal external to the core block at a rate slower than a rate at which the hardened routed signal is routed; conditioning the externally routed signal; and selecting the hardened routed signal or the externally routed signal.

The embodiment of the method can further include feeding back the selected signal within the core block. The element of selecting the hardened routed signal or the externally routed signal can include selecting the hardened routed signal; and the element of feeding back the selected signal within the core block can include feeding back the selected signal within the core block within a target number of clock cycles. The element of conditioning the externally routed signal can include combining the externally routed signal with a signal representing a type of debug event, or a signal representing a user-specified debug event. The hardened routing can be a non-programmable conductive path. The element of selecting the hardened routed signal or the externally routed signal can include selecting the hardened routed signal or the externally routed signal based on a value of: (1) a pin of the integrated, or (2) a control bit that is accessible by the core block. The core block can be a processor. The integrated circuit can be a field programmable gate array.

A second embodiment of the IC includes a core block that generates a debug signal. The core block includes a first routing path that is non-programmable and that routes the debug signal within the core block. In addition, the IC includes a second routing path, coupled to the core block, to route the debug signal external to the core block. The second routing path is programmable. The first routing path transmits the debug signal at a faster rate than the second routing path. Further, the IC includes a selection device, coupled to the first routing path and the second routing path, to select the signal routed using the first routing path, or the signal routed using the second routing path. In addition, the IC includes an external debug circuit, coupled to the second routing path, to condition the signal routed using the second routing path.

In this second embodiment, the external debug circuit can condition the signal routed using the second routing path by combining the signal routed using the second routing path with a signal representing a type of debug event, or a signal representing a user-specified debug event. The selection device can be a multiplexer that includes a control input, where the control input is coupled to: (1) a pin of the integrated circuit whose value is user controlled, or (2) a control bit that is accessible by the core block. The core block can further include a debug module that is coupled to the first routing path, the second routing path, and the selection device. The debug module can generate the debug signal. An output of the selection device can be fed back to the debug module.

BRIEF DESCRIPTION OF THE DRAWINGS

Accompanying drawings show embodiments of the present invention; however, the accompanying drawings should not be taken to limit the invention to only the embodiments shown. Various aspects and advantages of the invention will become apparent upon review of the following detailed description and upon reference to the drawings in which.

DETAILED DESCRIPTION OF THE DRAWINGS

One or more embodiments of the present invention are applicable to ICs. Specific examples are provided below that employ programmable ICs such as FPGAs. However, one or more embodiments of the present invention are not limited by these examples, and can be applied to any IC.

Figure 1:
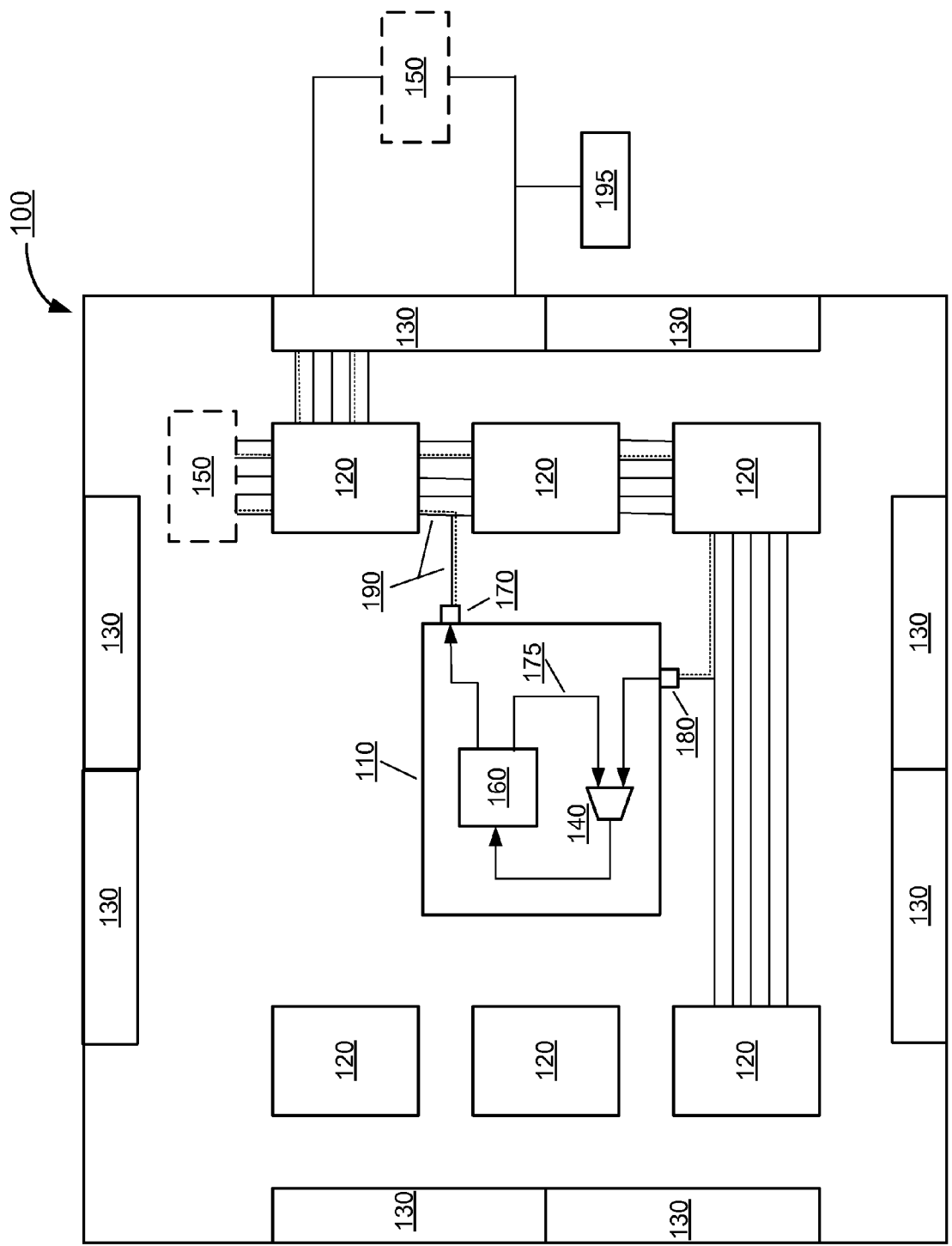
FIG. 1 shows an integrated circuit such as an FPGA according to an embodiment of the present invention.

FIG. 1 shows an integrated circuit such as, e.g., an FPGA 100 according to an embodiment of the present invention. The FPGA 100 includes a core block such as, e.g., a processor 110. Examples of the processor 110 are the PowerPC® 405 and the PowerPC® 440 available from International Business Machines ("IBM®") Corporation of Armonk, N.Y. However, other processors can be used. The FPGA 100 also includes CLBs 120 which are individually programmable and can be configured to perform various types of logic functions. Each of the CLBs 120 can include one or more "slices" where each slice contains components such as, e.g., a look-up table, a flip-flop, and a multiplexer. Programmable IOBs 130 can be configured to drive output signals from the CLBs 120 to external pins of the FPGA 100 and/or receive input signals from the FPGA pins and route them to the CLBs 120. Programmable routing such as programmable fabric routing 190 (note that only a small portion of the programmable fabric routing 190 is shown in FIG. 1) provides routing paths for signals and is, e.g., the wires and multiplexers that interconnect the components of the FPGA 100. The programmable fabric routing 190 programmably interconnects, e.g., the processor 110, the CLBs 120, and the IOBs 130. FPGA 100 can include other components such as, e.g., memory, delay lock loops, and clock circuits.

The processor 110 includes a debug module 160 that supports debug features such as, e.g., the trace feature which provides the capability to reconstruct the program flow (e.g., reconstruct the instruction execution sequence). If a debug feature such as the trace feature is enabled, then when a trace event occurs, the debug module 160 within the processor 110 generates a debug signal such as, e.g., a debug-trigger-event-output signal to indicate that a debug event occurred. A hardened routing 175 is coupled to the debug module 160. The term "coupled" as used herein includes both a direct coupling and an indirect coupling. The hardened routing 175 can be, e.g., a non-programmable conductive routing path. Further, the processor 110 is coupled to a programmable fabric routing 190. The debug-trigger-event-output signal can be routed external to the processor 110, via a debug-event-output pin 170, using the programmable fabric routing 190 (the signal routed using the programmable fabric routing 190 is referred to herein as the "externally routed signal"), or can be routed internally within the processor 110 using the hardened routing 175 (the signal routed using the hardened routing 175 is referred to herein as the "hardened routed signal").

The externally routed signal can be routed to an external debug circuit 150 which conditions the signal. The external debug circuit 150 is located external to the processor 110. More specifically, e.g., the external debug circuit 150 can be located outside the FPGA 100 or alternatively, can be located on the programmable fabric routing 190 within the FPGA 100 (the external debug circuit 150 at the two exemplary locations is shown using dashed-line blocks; however, the external debug circuit 150 can be located at other locations). If the external debug circuit 150 is located on the programmable fabric routing 190, then the external debug circuit 150 can be programmed (e.g., programmed as to when tracing should be activated) during initial configuration of the FPGA 100.

After the external debug circuit 150 conditions the debug-trigger-event-output signal, the conditioned signal is routed back to the processor 110. More specifically, if the external debug circuit 150 is located outside the FPGA 100, then the externally routed signal can be routed back to the processor 110 using, e.g., the IOB 130, the CLB 120, the programmable fabric routing 190, and a debug-event-input pin 180. Alternatively, if the external debug circuit 150 is located on the programmable fabric routing 190, then the externally routed signal can be routed back to the processor using, e.g., the programmable fabric routing 190, the CLB 120, and the debug-event-input pin 180. Exemplary signal paths are shown in FIG. 1 using dashed lines next to the routing lines (note that the signals can travel many other paths than those shown in FIG. 1).

The external debug circuit 150 performs debug functions such as, e.g., conditioning the debug-trigger-event-output signal so that the user has control over the trace generation; for example, the debug-trigger-event-output signal can be conditioned so that program flow is traced only when certain debug events occur. More specifically, the external debug circuit 150 can condition the asserted debug-trigger-event-output signal by combining this signal with one or both of: (1) a signal representing the type of debug event that caused the assertion of the debug-trigger-event-output signal, or (2) a signal representing a user-specified debug event. Examples of debug event types are an instruction address compare or a data address compare. An example of the user-specified debug event is a signal asserted by user logic located outside the processor 110 such as, e.g., a signal asserted by a floating point unit within the FPGA 100. By combining the signals, the trace collection is initiated only if and when the specific debug events occur.

The external debug circuit 150 can be coupled to a trace analyzer 195 which monitors the trace information and can display this information to a user. The trace analyzer 195 is located outside the FPGA 100 and after the debug-triggerevent-output signal is conditioned by the external debug circuit 150, the conditioned signal can be routed to the trace analyzer 195 which processes the trace information. An example of the trace analyzer 195 is RISCTrace™ available from IBM® Corporation. However, other trace analyzers can be used.

From the debug-event-input pin 180, the signal is routed to the multiplexer 140. The multiplexer 140 selects either the hardened routed signal or the externally routed signal for feeding back to the debug module 160. The hardened routed signal travels at a faster rate than the externally routed signal, and thus the hardened routed signal is more likely to be fed back within a target clock cycle needed to satisfy a certain timing requirement. For example, the hardened routed signal can be fed back within the processor 110 within one clock cycle and thus can satisfy the stringent timing requirement that the signal be fed back within the same clock cycle as required by some implementations of the trace feature. The hardened routing 175 allows the stringent timing requirements to be satisfied while still allowing the processor to run at full speed. The hardened routing path can be used, e.g., when the user does not wish to condition the debug-trigger-event-output signal using the external debug circuit 150 and thus the debug-trigger-event-output signal does not need to be transmitted outside the processor 110 using the programmable fabric routing 190.

Figure 2:
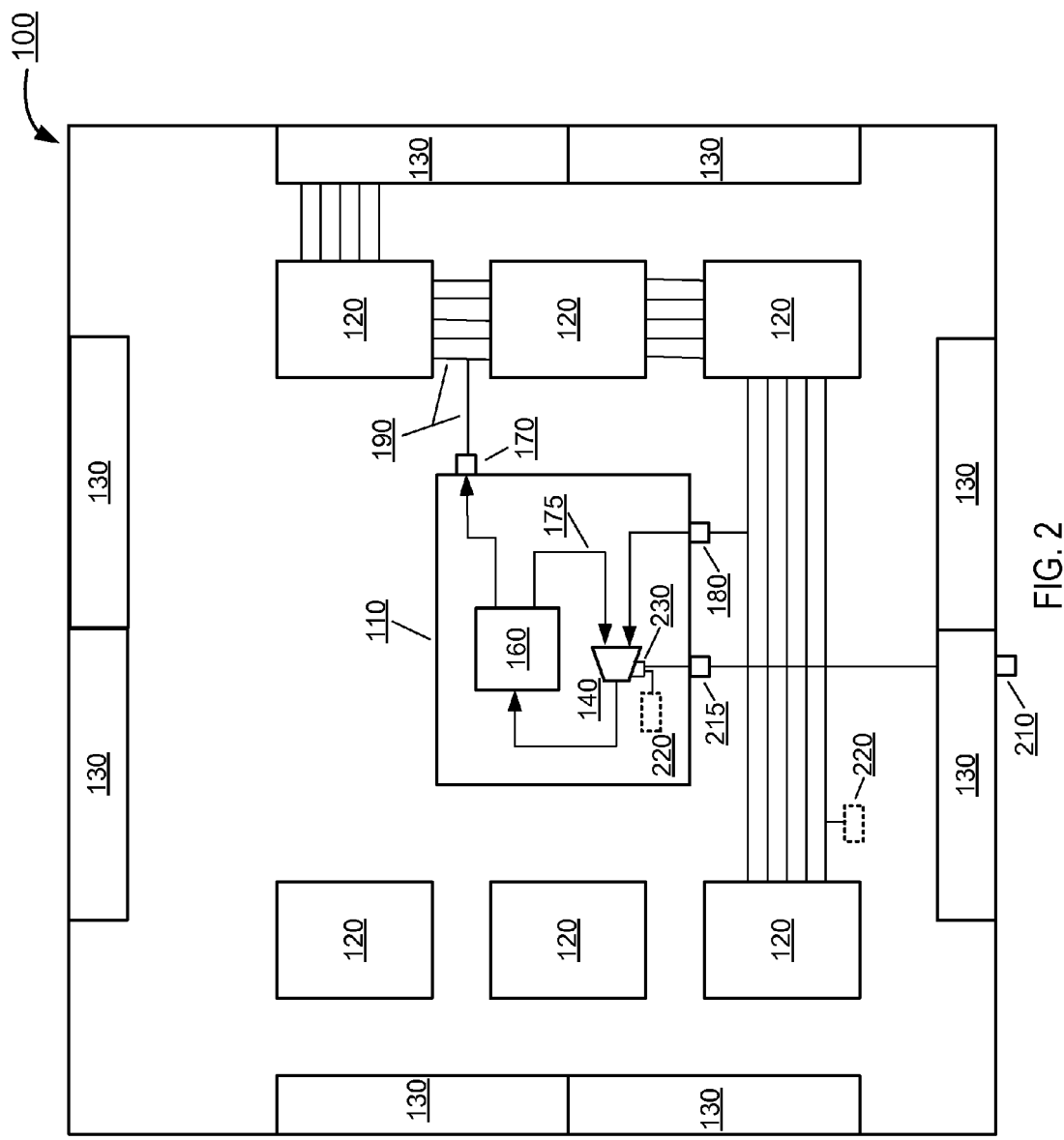
FIG. 2 shows another FPGA according to another embodiment of the present invention.

FIG. 2 shows a second FPGA according to another embodiment of the present invention. FIG. 2 describes various configurations for controlling which of the inputs of the multiplexer 140 is selected as its output. In one configuration, a pin 210 of the FPGA 100 allows a user to control the multiplexer 140 by, e.g., the user controlling whether the pin 210 is coupled to either a high ("1") or low ("0") voltage level. The user-specified control signal received at the pin 210 can be routed using the programmable fabric routing 190 or alternatively can be routed using hardened routing to a pin 215 of the processor 110 which is then routed to a control input 230 of the multiplexer 140. The input value received at the control input 230 determines which of the inputs is selected as the output of the multiplexer 140.

In another configuration, a value of a storage space such as a control bit 220, which is accessible by the processor 110, controls which input is selected as the output of the multiplexer 140. The control bit 220 can be located within the processor 110 or alternatively can be located outside the processor 110 (the control bit 220 at the two exemplary locations is shown using dashed-line blocks in FIG. 2; however, the control bit 220 can be located at other locations). If the control bit 220 is located outside the processor 110, then the value of the control bit 220 can be routed to the control input 230 using the programmable fabric routing 190 or alternatively using hardened routing. If the control bit 220 is located outside the processor 110, then it can be programmed during the initial configuration of the FPGA 100.

Figure 3:
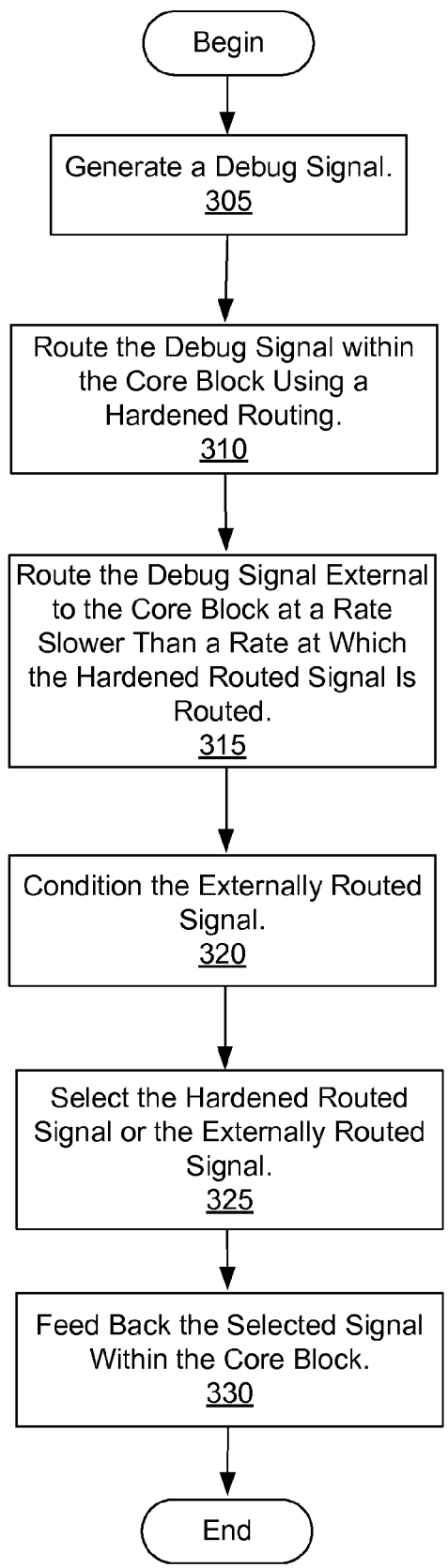
FIG. 3 shows a method to feed back a debug signal according to an embodiment of the present invention.

FIG. 3 shows a method to feed back a debug signal according to an embodiment of the present invention. In block 305, a debug signal is generated. For example, the processor 110 can generate the debug signal, and more specifically, the debug module 160 within the processor 110 can generate the debug signal. In block 310, the debug signal is routed within the core block using the hardened routing 175. In block 315, the debug signal is routed external to the core block at a rate slower than a rate at which the hardened routed signal is routed. In block 320, the externally routed signal is conditioned so that the user has greater control over the debug feature such as, e.g., greater control over when trace generation occurs. In block 325, the hardened routed signal or the externally routed signal is selected as the output of the multiplexer 140. If the user wanted to condition the signal, then the externally routed signal can be selected as the output of the multiplexer 140. Otherwise, the hardened routed signal which is transmitted at a faster rate can be selected as the output of the multiplexer 140. Since the hardened routed signal travels at a faster rate, stringent timing requirements of some debug features are more likely to be satisfied if the hardened routed signal is used. In block 330, the selected signal is fed back within the core block, and more specifically, e.g., the selected signal is fed back to the debug module 160.

As any person of ordinary skill in the art of integrated circuits (e.g., FPGAs) will recognize from the description, figures, and examples that modifications and changes can be made to the embodiments of the invention without departing from the scope of the invention defined by the following claims.

What is claimed is:

1. An integrated circuit, comprising:
    a processor that generates a debug signal, wherein the processor comprises a hardened routing to route the debug signal within the processor;
    a programmable routing, coupled to the processor, to route the debug signal external to the processor but within the integrated circuit, wherein the hardened routing transmits the debug signal at a faster rate than the programmable routing;
    a selection device, coupled to the hardened routing and the programmable routing, to select one of: the hardened routed signal or the externally routed signal; and
    an external debug circuit, coupled to the programmable routing, to condition the externally routed signal.

2. The integrated circuit of claim 1, wherein the processor comprises a debug module, coupled to the hardened routing, the programmable routing, and the selection device, wherein the debug module generates the debug signal, and an output of the selection device is fed back to the debug module.

3. The integrated circuit of claim 2, wherein the hardened routed signal is fed back to the debug module within a target number of clock cycles.

4. The integrated circuit of claim 1, wherein the external debug circuit conditions the externally routed signal by combining the externally routed signal with one of: a signal representing a type of debug event, or a signal representing a user-specified debug event.

5. The integrated circuit of claim 1, wherein the hardened routing is a non-programmable conductive path.

6. The integrated circuit of claim 1, wherein the selection device is a multiplexer that includes a control input, wherein the control input is coupled to one of: (1) a pin of the integrated circuit whose value is user controlled, or (2) a control bit that is accessible by the processor.

7. The integrated circuit of claim 1, wherein the selection device is a multiplexer residing within the processor.

8. The integrated circuit of claim 1, wherein the integrated circuit is a field programmable gate array.

9. A method to feed back a debug signal within a processor of an integrated circuit, comprising:
    generating the debug signal;
    routing the debug signal within the processor using a hardened routing;
    routing the debug signal external to the processor but within the integrated circuit, wherein the externally routed signal is routed at a rate slower than a rate at which the hardened routed signal is routed;
    conditioning the externally routed signal; and selecting one of: the hardened routed signal or the externally routed signal.

10. The method of claim 9, further comprising feeding back the selected signal within the processor.

11. The method of claim 10, wherein selecting one of the hardened routed signal or the externally routed signal comprises selecting the hardened routed signal, and feeding back the selected signal within the processor comprises feeding back the selected signal within the processor within a target number of clock cycles.

12. The method of claim of claim 9, wherein conditioning the externally routed signal comprises combining the externally routed signal with one of: a signal representing a type of debug event, or a signal representing a user-specified debug event.

13. The method of claim 9, wherein the hardened routing is a non-programmable conductive path.

14. The method of claim 9, wherein selecting one of the hardened routed signal or the externally routed signal comprises selecting one of the hardened routed signal or the externally routed signal based on a value of: (1) a pin of the integrated circuit, or (2) a control bit that is accessible by the processor.

15. The method of claim 9, wherein the integrated circuit is a field programmable gate array.

16. An integrated circuit, comprising:
a processor that generates a debug signal, wherein the core block processor comprises a first routing path that is non-programmable and that routes the debug signal within the processor;
a second routing path, coupled to the processor, to route the debug signal external to the processor but within the integrated circuit, wherein the second routing path is programmable, and the first routing path transmits the debug signal at a faster rate than the second routing path;
a selection device, coupled to the first routing path and the second routing path, to select one of: the signal routed using the first routing path or the signal routed using the second routing path; and
an external debug circuit, coupled to the second routing path, to condition the signal routed using the second routing path.

17. The integrated circuit of claim 16, wherein the external debug circuit conditions the signal routed using the second routing path by combining the signal routed using the second routing path with one of: a signal representing a type of debug event, or a signal representing a user-specified debug event.

18. The integrated circuit of claim 16, wherein the selection device is a multiplexer comprising a control input, wherein the control input is coupled to one of: (1) a pin of the integrated circuit whose value is user controlled, or (2) a control bit that is accessible by the processor.

19. The integrated circuit of claim 16, wherein the processor comprises a debug module, coupled to the first routing path, the second routing path, and the selection device, wherein the debug module generates the debug signal, and an output of the selection device is fed back to the debug module.

* * * * *